United States Patent [19]

Bakes et al.

[11] 4,022,703

[45] May 10, 1977

[54] STABILIZATION OF HYDROGEN PEROXIDE IN ACID BATHS FOR CLEANING METALS

[75] Inventors: Michel Bakes, Saint Cloud; Michel Roche, Roubaix, both of France

[73] Assignee: Produits Chimiques Ugine Kuhlmann, Paris, France

[22] Filed: Jan. 13, 1976

[21] Appl. No.: 649,131

[30] Foreign Application Priority Data

Jan. 14, 1975 France .............................. 75.00923

[52] U.S. Cl. .............................. 252/100; 252/79.2; 252/79.4; 252/102; 252/186; 156/659; 156/664; 134/3; 423/272; 423/584
[51] Int. Cl.² .......................................... C11D 7/60
[58] Field of Search ................ 252/100, 102, 79.2, 252/79.4, 186; 156/14, 18; 423/272, 584; 134/3

[56] References Cited

UNITED STATES PATENTS

| | | | |
|---|---|---|---|
| 3,514,411 | 5/1970 | Kolobielski | 252/148 |
| 3,649,194 | 3/1972 | Glanville | 252/100 X |
| 3,905,907 | 9/1975 | Shiga | 252/79.4 |

*Primary Examiner*—Mayer Weinblatt
*Attorney, Agent, or Firm*—Brooks Haidt Haffner & Delahunty

[57] ABSTRACT

Hydrogen peroxide-containing acidic baths for pickling metals, the bath compositions being stabilized according to the invention so that the baths can be used over long periods of time without appreciable decomposition of hydrogen peroxide, such baths containing from about 10 to 400 g/liter of sulfuric acid, 2 to 80 g/liter of 100% hydrogen peroxide, and 10 to 500 mg/liter of an oxyquinoline derivative stabilizer, the compositions optionally containing a surface active agent, and/or from 0.3 to 2 g/liter of fatty alcohol-ethylene oxide polycondensate stabilizer as well as methods for pickling metals using such baths.

5 Claims, No Drawings

STABILIZATION OF HYDROGEN PEROXIDE IN ACID BATHS FOR CLEANING METALS

BACKGROUND OF THE INVENTION

The present invention relates to processes for pickling metals with acid solutions containing hydrogen peroxide, and more particularly, it relates to methods for stabilizing hydrogen peroxide in such solutions, as well as to the solutions themselves.

It is known to use sulfuric acid baths containing hydrogen peroxide to pickle or clean metals. In the case of a divalent metal, M, the reaction occurs according to the following equation:

$$M + H_2SO_4 + H_2O_2 \rightarrow MSO_4 + 2 H_2O$$

The hydrogen peroxide, however, is a material which is very sensitive to the presence of impurities which catalyse its decomposition. Among these impurities, metallic impurities are among the most active, and it is accordingly necessary to stabilize hydrogen peroxide-containing baths for pickling metals.

Among the additive materials proposed to stabilize the hydrogen peroxide in such baths are ethylene glycol and polyethylene glycols in British Patent 1,157,038 and French Patent 1,539,960; saturated aliphatic alcohols in U.S. Pat. No. 3,957,290; urea and its derivatives in British Patent 1,160,134; phenacetin and sulfathiazole in French Patent 1,427,149; and phenol in U.S. Pat. No. 3,649,194 and French Patent 2,065,380. Such prior art stabilizing agents used even up to the present time suffer a number of disadvantages. Thus, some of them are only slightly soluble in the pickling baths, while others complex the metal to be pickled. Yet others are toxic, while some of these prior art agents also inhibit or retard the pickling action of the baths.

THE INVENTION

It has now been discovered that certain quinoline derivatives and/or a certain polycondensation surface active agent stabilize the hydrogen peroxide in acid pickling baths and do not suffer the disadvantages of the prior art materials. The quinoline derivatives contemplated for use herein are 8-hydroxyquinolines which are salts of certain acids or nitro or sulfo derivatives. More specifically the present invention embraces hydrogen peroxide-containing metal pickling baths which are stabilized with an effective amount of one or more 8-hydroxy-quinolines such as the neutral sulfate of 8-hydroxyquinoline, $(C_9H_6NOH)_2H_2SO_4$, (also known as orthohydroxyquinoline), the 8-oxyquinoline derivative of phthalylsulfathiazole, 5-sulfo-6-methyl-8-oxyquinoline, and 8-hydroxy-quinoline salicylate and/or an ethylene oxide polycondensate of fatty alcohol. The use of such baths for cleaning or pickling metals is also contemplated herein.

The oxyquinoline stabilizers of the present invention are used in quantities sufficient to protect the hydrogen peroxide. It is generally desirable to use from about 10 to 500 ppm of the oxyquinoline stabilizers in the pickling baths, and amounts of from 20 to 100 ppm are preferred.

Unless otherwise indicated, all parts percentages, proportions, and ratios herein are by weight.

It has also been found desirable to have the baths according to the present invention contain a surface active agent. In effect, the surface active agent, by modifying the surface tension of the baths, permits a better solid-liquid contact and improves the speed of the pickling. It also permits improving the quality of the film on the workpieces, at the time they are removed from the baths.

It has further been found according to the present invention that surface active agents formed by polycondensation of fatty alcohols with ethylene oxide provide excellent results and permit the same notable improvement in the stability of the pickling baths. Surface active agents prepared from fatty alcohols containing from about 8 to about 20 carbon atoms condensed with from about 2 to about 50 moles of ethylene oxide are preferred, and one particularly effective fatty alcohol polycondensate is sold under the name "UKANIL" by Produits Chimiques Ugine Kuhlmann, Paris, France. This material is prepared by condensing about none moles of ethylene oxide with fatty alcohols derived from olefin.

Even used alone, without the oxyquinoline derivative stabilizers of this invention, these fatty alcohol-derived surface active agents effectively stabilize such pickling baths. The amohnt of surface active agent added to the pickling baths is desirably sufficient to provide a concentration of from about 0.3 to about 2 g/liter.

The temperatures utilized for the pickling treatment of the present invention can range from ambient to somewhat elevated. Generally, temperatures from 25° to about 65° C can be used, and temperatures of about 50° C give very good results.

A typical bath used for pickling metals, and in particular copper, according to the present invention contains from about 100 to 400 g/liter of sulfuric acid, from about 2 to about 80 g/liter of 100% hydrogen peroxide, from about 10 to about 500 mg/liter of the oxyquinoline stabilizer, and from about 0.3 to about 2 g/liter of surface active agent. In practice, the pickling bath contains, except at the beginning of the operation, fairly substantial quantities of the sulfate of the metal to be pickled.

The following examples are given to illustrate embodiments of the invention as it is presently preferred to practice it. It will be understood that these examples are illustrative, and the invention is not to be considered as restricted thereto except as indicated in the appended claims.

EXAMPLE I

This illustration relates to the pickling of copper with a solution which does not contain a stabilizer according to the present invention.

A pickling solution is prepared to contain 100 g/liter of sulfuric acid, expressed as 100% acid, 30 g/liter of copper in the form of copper sulfate tetrahydrate, and 20 g/liter of hydrogen peroxide, expressed as 100% peroxide. The temperature of this solution is maintained at 50° C.

After 6 hours, the solution does not contain more than 67% of the hydrogen peroxide initially added, and after 24 hours it does not contain more than 20%.

EXAMPLE II

A solution is prepared identically to that described in Example I, but 30 mg/liter of the neutral sulfate of 8-hydroxy-quinoline is added. The temperature of this solution is then maintained at 50° C.

At the end of 6 hours, this solution contains about 99% of the hydrogen peroxide originally added, and at the end of 24 hours the bath contains about 93% of the original hydrogen peroxide.

EXAMPLE III

The same solution is prepared as in Example I, except that 50 mg/liter of the neutral sulfate of 8-hydroxyquinoline is added. The solution is then maintained at a temperature of 50° C.

After 6 hours, all of the hydrogen peroxide originally introduced is still present in the solution, and at the end of 24 hours, it still contains 97% of the peroxide.

EXAMPLE IV

To a bath having the composition described in Example I, 100 mg/liter of the sulfate of ortho-oxyquinoline is added. This bath is then maintained at 50° C.

At the end of six hours, there remains 99% of the initial amount of hydrogen peroxide; at the end of 24 hours, 98%; and after 48 hours, 68%.

EXAMPLE V

A bath is prepared as in Example I, and one gram/liter of UKANIL fatty alcohol-ethylene oxide condensate is added. The temperature of the bath is thereupon maintained at 50° C..

At the end of 6 hours, there remains 92% of the original hydrogen peroxide; after 24 hours, 86%; and after 48 hours, 67%.

EXAMPLE VI

To a bath having the composition set forth in Example I is added 1 gram/liter of UKANIL and 50 mg/liter of ortho-oxyquinoline sulfate. The temperature of the solution is maintained at 50° C.

After 6 hours, there remains 99% of the original hydrogen peroxide; at the end of 24 hours, 93%; and after 48 hours, 80%.

It will be understood from the present description that the other 8-oxyquinoline derivatives disclosed herein will provide comparable results in stabilizing hydrogen peroxide in acid baths for pickling metals. Such baths can be used to pickle a wide variety of metals, and it will be understood that the baths according to this invention exhibit longer life and provide very good cleaning action on the metals.

What is claimed is:

1. An acid bath composition for pickling metals which consists essentially of sulfuric acid and hydrogen peroxide and as a stabilizer for the hydrogen peroxide a mixture of at least one 8-hydroxyquinoline derivative which is the neutral sulfate of 8-hydroxyquinoline, the 8-hydroxyquinoline of phthalylsulfathiazole, 5-sulfo-6-methyl-8-hydroxyquinoline, 5-nitro-8-hydroxyquinoline, 5-sulfo-8-hydroxyquinoline, or 8-oxyquinoline salicylate and a fatty alcohol-ethylene oxide polycondensate prepared from fatty alcohols containing from about eight to about twenty carbon atoms condensed with from about two to about fifty moles of ethylene oxide, the amount of the stabilizer being effective to protect the peroxide from decomposition due to impurities in the bath.

2. A composition according to claim 1 wherein the concentration of sulfuric acid, expressed as 100 percent $H_2SO_4$, is from about 10 to about 400 g/liter, the concentration of hydrogen peroxide, expressed as 100 percent $H_2O_2$, is from about 2 to about 80 g/liter, the concentration of the 8-hydroxyquinoline derivative is from about 10 to about 500 mg/liter, and the concentration of the condensate is from about 0.3 to about 2 g/liter.

3. A composition according to claim 1 wherein there is also present a further surface active agent.

4. A composition according to claim 1 wherein the 8-oxyquinoline and the polycondensate are both present.

5. A method for pickling metals which comprises contacting a surface of the metal with the stabilized composition according to claim 1.

* * * * *